A. M. TULLY.
SPRING WHEEL.
APPLICATION FILED MAR. 14, 1912.
1,041,910.
Patented Oct. 22, 1912.
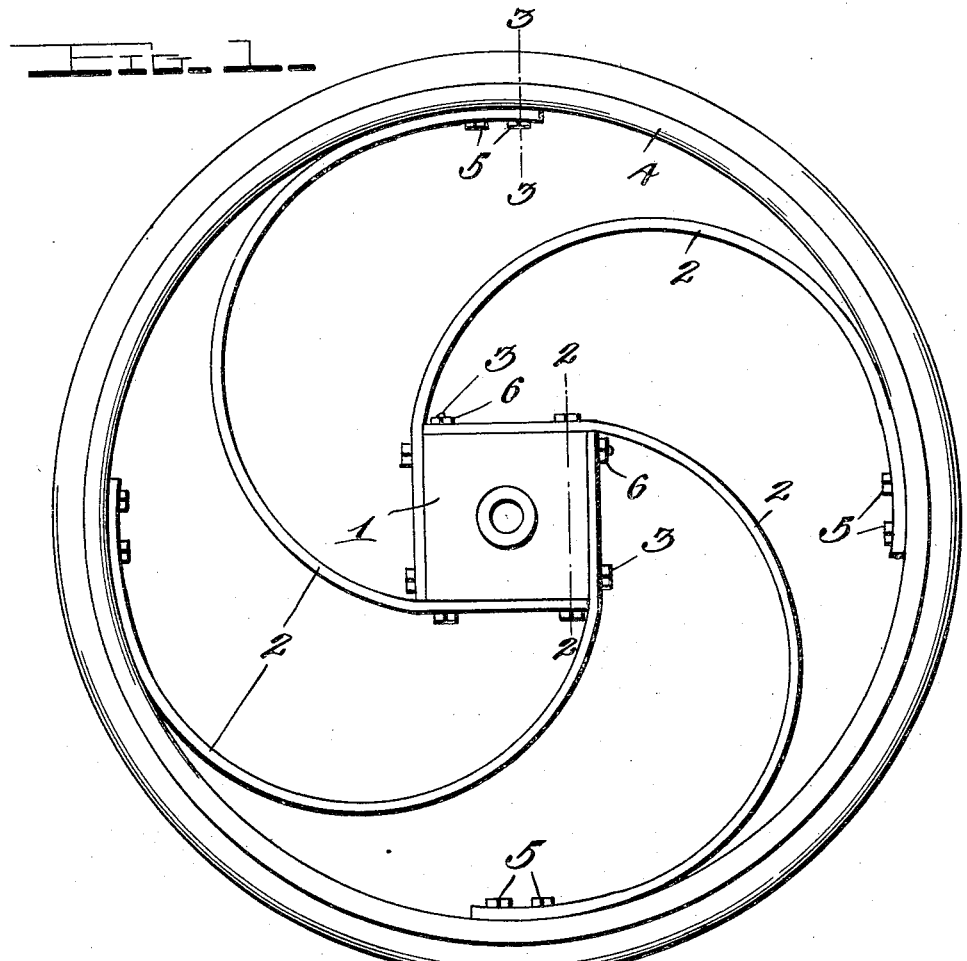
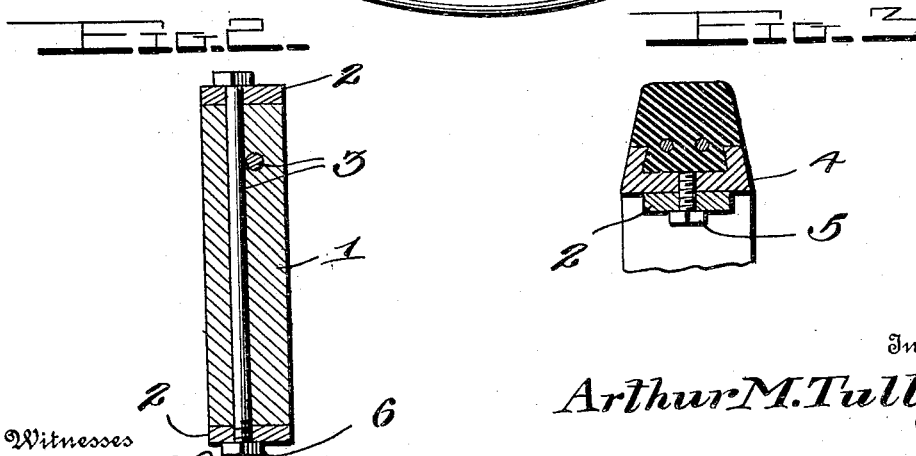
Witnesses
Chas. L. Griesbauer.
A. B. Norton.
Inventor
Arthur M. Tully,
By Watson E. Coleman
Attorney

UNITED STATES PATENT OFFICE.

ARTHUR M. TULLY, OF WOODVILLE, FLORIDA.

SPRING-WHEEL.

1,041,910.  Specification of Letters Patent.  Patented Oct. 22, 1912.

Application filed March 14, 1912. Serial No. 683,789.

*To all whom it may concern:*

Be it known that I, ARTHUR M. TULLY, a citizen of the United States, residing at Woodville, in the county of Leon and State of Florida, have invented certain new and useful Improvements in Spring-Wheels, of which the following is a specification, reference being had to the accompanying drawings.

This invention relates to new and useful improvements in vehicle wheels and more particularly to automobile wheels, the object of the invention being to provide a wheel of this character which consists of a hub of polygonal form and a plurality of curved spring spokes connecting the hub with the rim.

Another object of the invention is to provide a wheel adapted to absorb the shock and irregularity of movement incident to usage on rough roads, so that an occupant of a vehicle will feel the shocks as little as possible.

A further object of the invention is to provide a wheel of this character which will possess advantages in points of efficiency and durability, is inexpensive of manufacture and at the same time is simple in construction and operation.

With the above and other objects in view the invention consists in the novel features of construction and the combination and arrangement of parts hereinafter more fully described, pointed out in the claim and shown in the accompanying drawings in which, Figure 1 is a side elevation of a vehicle wheel constructed in accordance with my invention. Fig. 2 is a sectional view on the line 2—2 of Fig. 1, and Fig. 3 is a sectional view on the line 3—3 of Fig. 1.

Referring more particularly to the drawings, 1 indicates the hub which is preferably formed of metal or other suitable material. The hub 1 is shown in the drawings as rectangular in shape but it will be understood that it may be of any polygonal form.

A plurality of C-shaped resilient spokes 2 are provided having their inner ends rigidly secured to the faces of the hub by means of the bolts 3, the outer ends of said spokes being rigidly secured to the rim 4 at a point directly opposite their inner fixed end by means of the bolts 5. It will be seen from the drawings that the bolts 3 run entirely through the hub so that the heads of the bolts securely hold one spring and the nuts 6 threaded on the other ends hold another spring.

From the above it will be seen that I have provided a simple and durable spring wheel which absorbs the shock and irregularity of movement incident to usage on rough roads, so that the occupants of the vehicle will feel the shocks as little as possible.

While I have shown and described the preferred form of my invention it will be obvious that various changes in the details of construction and in the proportions may be resorted to for successfully carrying my invention into practice without sacrificing any of the novel features or departing from the scope thereof.

What I claim is:—

In a device of the character described, the combination of a rim, an angular hub, a plurality of C shaped resilient spokes, each of said spokes having its inner end secured to one of the faces of the hub, and its outer end secured to the rim at a point opposite its inner end, bolts, each of said bolts adapted to pass through the hub and the inner ends of two of the said resilient spokes thereby securing the said spokes to the hub.

In testimony whereof I hereunto affix my signature in the presence of two witnesses.

ARTHUR M. TULLY.

Witnesses:
 F. C. WILLIAMSON,
 O. R. HARRELL.

Copies of this patent may be obtained for five cents each, by addressing the "Commissioner of Patents. Washington, D. C."